F. L. KOEPKE.
ARTIFICIAL BAIT.
APPLICATION FILED MAR. 19, 1921.

1,415,653. Patented May 9, 1922.

Inventor:
Frank L. Koepke.

By [signature]
Attorneys.

UNITED STATES PATENT OFFICE.

FRANK L. KOEPKE, OF RIDGEFIELD, WASHINGTON.

ARTIFICIAL BAIT.

1,415,653.  Specification of Letters Patent.  Patented May 9, 1922.

Application filed March 19, 1921. Serial No. 453,618.

*To all whom it may concern:*

Be it known that I, FRANK L. KOEPKE, a citizen of the United States, residing at Ridgefield, in the county of Clarke, State of Washington, have invented certain new and useful Improvements in Artificial Bait; and I do hereby declare the following to be a full, clear, and exact description of the invention, such as will enable others skilled in the art to which it appertains to make and use the same.

This invention relates to new and useful improvements in fishing tackle and particularly to artificial bait.

One object of the invention is to provide a bait which can be adjusted so that it will dive to greater or lesser depths, according to the depth of the water wherein the bait is used, or to skim along the surface, or slightly below the surface, on an approximately even keel.

Another object of the invention is to provide a bait which can be weighted at either or both ends, by introducing water, and sealing the same therein by means of stoppers, which will cause the bait to dive and perform other actions to attract fish, when drawn through the water, and which will aid in casting the line.

Other objects and advantages will be apparent from the following description when taken in connection with the accompanying drawing.

Figure 1:
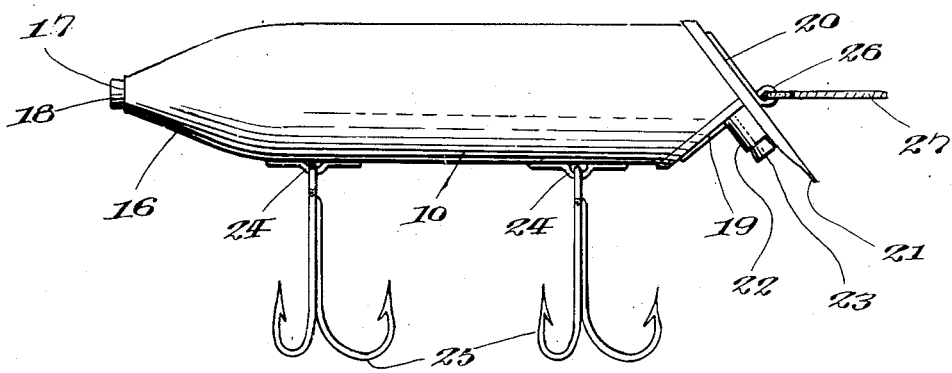
Figure 1 is a side elevation of a bait made in accordance with the invention.
Figure 2:
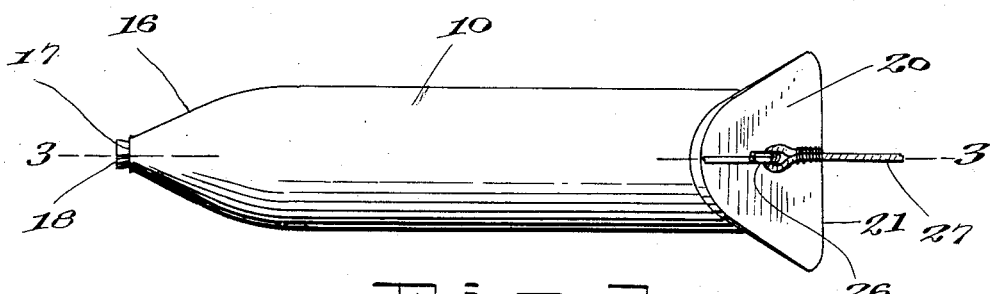
Figure 2 is a top plan view of the bait.
Figure 3:
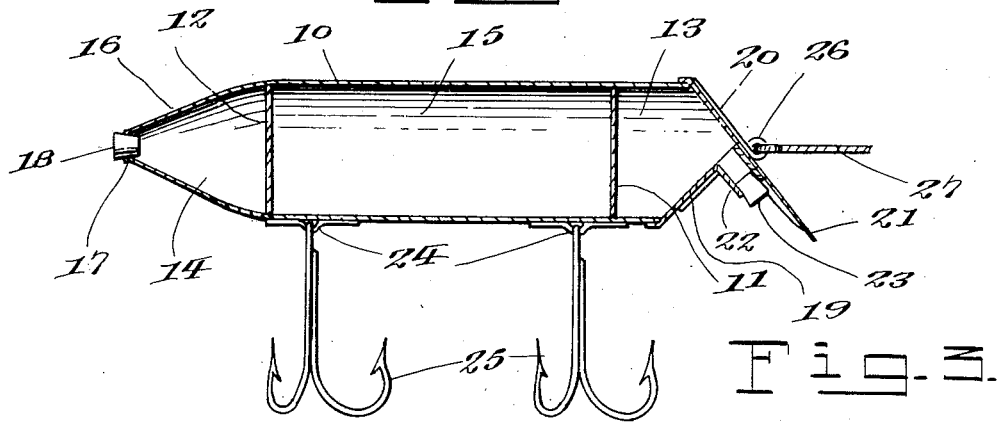
Figure 3 is a vertical longitudinal central sectional view through the bait, taken on the line 3—3 of Figure 2.

Referring particularly to the accompanying drawing, 10 represents a cylindrical casing or shell having the two vertical transverse partitions 11 and 12, arranged in the forward and rearward portions of the shell, to provide the front and rear compartments 13 and 14, and the longer intermediate compartment 15. The rearward end of the shell is tapered as shown at 16, and formed with a mouth 17 in which is fitted a removable stopper 18. The front end of the shell is inclined downwardly and forwardly and upwardly and forwardly, as shown at 19 and 20, respectively, the wall of the upper incline 20 extending downwardly and forwardly past the lower side of the shell in the form of a web or fin 21 which is deflected by the water, as the bait is pulled therethrough, to cause the bait to dive and wiggle, in successive movements. Extending rearwardly from the wall 19 is a filling nipple 22, in which is removably disposed a closure stopper 23.

On the lower side of the body of the shell are carried rings or eyes 24 to which are attached depending hooks 25.

It will be noted that the fin or web 21 widens toward its lower end.

Carried by the upper portion of the fin is a ring or eye 26 to which the line 27 is attached, and by means of which the bait is drawn through the water.

By filling the front compartment 13 with water, when the bait is drawn through the water of a river or stream, the forward end of the bait will be heavier than the rear end so that it will more readily dive, as the inclined face of the fin engages with the water. When the rear compartment is filled with water, the bait will not dive so deeply as when the front compartment is filled, thus making the bait a shallow water diver, whereas the first case provides for deep diving. To cause the bait to sink and remain near the bottom, or at a certain distance below the surface, as when fishing in small streams, both compartments 13 and 14 are filled with water, thus causing the bait to remain on an approximately even keel.

By the introduction of water into either or both of the compartments 13 and 14, the bait is made heavier than bait heretofore, of this type, thus rendering the casting of the line easier.

The bait is thus adapted for use in water of any depth or character.

What is claimed is:

An artificial bait comprising a hollow elongated body having its rear end tapered and provided with a filling opening in the apex thereof, a closure removable in said opening, the forward end of the body beveled from the upper and lower sides toward the transverse center of the end of the body, a filling nozzle in the forward end of the body extending at right angles from the lower bevel face and provided with a removable stopper, and a downwardly and forwardly extending and downwardly widening fin on the upper bevel face of the forward end of the body for contact with the water of a stream to deflect the body downwardly thereinto, said fin extending in parallel relation to the filling nozzle and projecting past the end thereof.

In testimony whereof, I affix my signature, in the presence of two witnesses.

FRANK L. KOEPKE

Witnesses:
 FRED. QUARRIE,
 HUGH B. APPERSON.